United States Patent
Kim

(10) Patent No.: US 9,736,667 B2
(45) Date of Patent: Aug. 15, 2017

(54) VEHICLE AND METHOD OF CONTROLLING THE SAME

(71) Applicant: HYUNDAI MOTOR COMPANY, Seoul (KR)

(72) Inventor: Yong Kim, Incheon (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 14/862,961

(22) Filed: Sep. 23, 2015

(65) Prior Publication Data

US 2016/0205521 A1    Jul. 14, 2016

(30) Foreign Application Priority Data

Jan. 9, 2015    (KR) .................. 10-2015-0003375

(51) Int. Cl.
| | | |
|---|---|---|
| H04W 4/18 | (2009.01) | |
| B60K 37/02 | (2006.01) | |
| B60R 1/00 | (2006.01) | |
| G01C 21/26 | (2006.01) | |
| H04L 29/06 | (2006.01) | |
| H04L 29/08 | (2006.01) | |

(52) U.S. Cl.
CPC .............. *H04W 4/18* (2013.01); *B60K 37/02* (2013.01); *B60R 1/00* (2013.01); *G01C 21/26* (2013.01); *H04L 67/12* (2013.01); *H04L 67/2823* (2013.01); *H04L 69/08* (2013.01)

(58) Field of Classification Search
None
See application file for complete search history.

(56) References Cited

U.S. PATENT DOCUMENTS

| | | | | |
|---|---|---|---|---|
| 2005/0245272 | A1* | 11/2005 | Spaur .................. | H04L 12/4625 455/456.3 |
| 2011/0093165 | A1* | 4/2011 | Miller .................... | B60R 22/48 701/36 |
| 2012/0206255 | A1* | 8/2012 | Morris ................ | B60R 16/0232 340/439 |
| 2014/0106712 | A1* | 4/2014 | Scholz .................. | G01C 21/26 455/411 |
| 2014/0309870 | A1* | 10/2014 | Ricci ..................... | H04W 48/04 701/36 |

(Continued)

FOREIGN PATENT DOCUMENTS

| | | |
|---|---|---|
| JP | 2000-66967 A | 3/2000 |
| JP | 2000-284808 A | 10/2000 |

(Continued)

OTHER PUBLICATIONS

Korean Notice of Allowance issued in Korean Application No. 10-2015-0003375 dated Aug. 1, 2016, with English Translation.

*Primary Examiner* — Faris Almatrahi
*Assistant Examiner* — Tamara Weber
(74) *Attorney, Agent, or Firm* — McDermott Will & Emery LLP

(57) ABSTRACT

A vehicle includes a terminal connection unit configured to access portable terminals, a terminal communication unit configured to receive signals from the accessed portable terminals according to types of the terminals and generate normalized data, and a control unit configured to generate a control signal for controlling a corresponding component in the vehicle based on the normalized data.

16 Claims, 15 Drawing Sheets

(56) References Cited

U.S. PATENT DOCUMENTS

2015/0082410 A1* 3/2015 Fitzgerald .............. H04L 63/08
726/9

FOREIGN PATENT DOCUMENTS

| JP | 2002-331882 A | 11/2002 |
| JP | 2014-99840 A | 5/2014 |
| KR | 10-2009-0036345 A | 4/2009 |
| KR | 10-2011-0140023 A | 12/2011 |
| KR | 10-2013-0014203 A | 2/2013 |

* cited by examiner

FIG. 7

| TERMINAL OS | TERMINAL ANALYZER | PROTOCOL | GROUP |
|---|---|---|---|
| FIRST OS EX)IOS | FIRST TERMINAL ANALYZER | FIRST PROTOCOL EX)IAP | TURN-BY-TURN |
| | | | MEDIA |
| | | | TELEPHONE |
| SECOND OS EX)ANDROID | SECOND TERMINAL ANALYZER | SECOND PROTOCOL EX)AOAP | TURN-BY-TURN |
| | | | MEDIA |
| | | THIRD PROTOCOL EX)BLUTOOTH HFP | TELEPHONE |

FIG. 8

| GROUP | FIELD | NORMALIZED DATA |
|---|---|---|
| TURN-BY-TURN | 1 | SENTENCE ID : "TBT" |
| | 2 | DIRECTION GUIDE :"EXIT LEFT","EXIT RIGHT", "TURN LEFT","TURN RIGHT","U TURN", "KEEP STRAIGHT","ARRIVED" |
| | 3 | REMAINING DISTANCE FOR DIRECTION GUIDE (IN UNITS OF METERS) |
| | 4 | CHECKSUM |
| MEDIA | 1 | SENTENCE ID : "MEDIA" |
| | 2 | TYPE OF MEDIUM WHICH IS OUTPUTTING SOUND "MUSIC","INTERNET RADIO","AOD" |
| | 3 | CHECKSUM |
| TELEPHONE | 1 | SENTENCE ID : "CALL" |
| | 2 | TELEPHONE STATE : "INCOMING CALL"- CALL IS INCOMING, "ACTIVE CALL" -CALL IS IN PROGRESS,"HANG UP"-CALL HAS ENDED |
| | 3 | CHECKSUM |

FIG. 9

| FIRST FIELD | SECOND FIELD | | THIRD FIELD | FOURTH FIELD |
|---|---|---|---|---|
| TBT<br>EX) 1 | 00 | NONE | REMAINING<br>DISTANCE<br>EX) 300[M] | CHECKSUM |
| | 01 | EXIT LEFT | | |
| | 02 | EXIT RIGHT | | |
| | ⋮ | ⋮ | | |
| MEDIA<br>EX) 2 | 00 | NONE | CHECKSUM | |
| | 01 | MUSIC | | |
| | 02 | INTERNET RADIO | | |
| | ⋮ | ⋮ | | |
| CALL<br>EX) 3 | 00 | NONE | CHECKSUM | |
| | 01 | INCOMING CALL | | |
| | 02 | ACTIVE CALL | | |
| | 03 | HANG UP | | |
| | ⋮ | ⋮ | | |

VEHICLE AND METHOD OF CONTROLLING THE SAME

CROSS-REFERENCE TO RELATED APPLICATION

This application claims priority to and the benefit of Korean Patent Application No. 10-2015-0003375, filed on Jan. 9, 2015 in the Korean Intellectual Property Office, the disclosure of which is incorporated herein by reference.

TECHNICAL FIELD

The present disclosure relates to a vehicle connected with a portable terminal and a method of controlling the vehicle.

BACKGROUND

A vehicle may provide various forms of entertainment, for example, music and television (TV) broadcasts, in addition to transportation purpose.

Recently, in-vehicle infotainment which allows an output device installed in a vehicle and a portable terminal to operate in conjunction with each other and exchange various information or play media, such as music or a video, has been developed.

A system for providing in-vehicle infotainment may provide convenience to a user by providing the user with a variety of data or information in the form of sound, an image, or a combination thereof.

To implement a system for providing in-vehicle infotainment, a vehicle audio-video navigation (AVN) system that performs functions of a portable terminal (i.e., mirroring) for providing an audio service such as a radio and a compact disk (CD), a video service such as a digital versatile disk (DVD), a navigation service such as a destination guidance function, etc. is provided in a vehicle.

SUMMARY

Therefore, it is an aspect of the present invention to provide a vehicle in which it is possible to perform communication between an audio-video navigation (AVN) system and a portable terminal or execute an in-vehicle application regardless of the type of the portable terminal when the AVN system provides a mirroring service, and a method of controlling the vehicle.

Additional aspects of the invention will be set forth in part in the description which follows and, in part, will be obvious from the description, or may be learned by practice of the invention.

In accordance with one aspect of the present invention, a vehicle includes: a terminal connection unit configured to access portable terminals; a terminal communication unit configured to receive signals from the accessed portable terminals according to types of the terminals and generate normalized data; and a control unit configured to generate a control signal for controlling a corresponding component in the vehicle based on the normalized data.

The vehicle may further include a vehicle signal conversion unit configured to convert the normalized data into a vehicle signal conforming to a protocol supported by a vehicle communication network.

The vehicle signal conversion unit may convert the normalized data into the vehicle signal conforming to a controller area network (CAN) protocol.

The vehicle signal conversion unit may convert the normalized data into the vehicle signal including a numerical value.

The terminal communication unit may include: a terminal determination unit configured to determine the types of the portable terminals; and a terminal signal analysis unit configured to analyze the signals received from the portable terminals according to the types of the portable terminals and generate the normalized data based on results of the analysis.

The terminal determination unit may determine operating systems (OSs) of the portable terminals, and the terminal signal analysis unit may include: a first terminal analyzer configured to analyze a signal received from a first portable terminal supporting a first OS; a second terminal analyzer configured to analyze a signal received from a second portable terminal supporting a second OS; and a normalizer configured to generate the normalized data based on results of the analysis by the first terminal analyzer or the second terminal analyzer.

The first terminal analyzer and the second terminal analyzer may determine groups of the signals received from the portable terminals.

The first terminal analyzer and the second terminal analyzer may determine that the signals received from the portable terminals correspond to at least one of a turn-by-turn (TBT) signal, a media signal, and a telephone signal.

The normalized data may have a plurality of fields.

The normalized data may include a character string.

The vehicle may further include a display unit configured to display at least one of navigation information, media information, and telephone information to a user based on the control signal.

The terminal connection unit may be implemented as a Universal Serial Bus (USB) port or an auxiliary (AUX) port connected to the portable terminals through a cable.

The terminal connection unit may be implemented as a wireless communication module connected to the portable terminals through a wireless communication network.

In accordance with another aspect of the present invention, a vehicle includes: a terminal connection unit configured to access portable terminals; a terminal communication unit configured to receive signals from the accessed portable terminals according to types of the terminals and generate normalized data; and a vehicle signal conversion unit configured to convert the normalized data into a vehicle signal conforming to a protocol supported by a vehicle communication network.

The vehicle signal conversion unit may convert the normalized data into the vehicle signal conforming to a CAN protocol.

The terminal communication unit may include: a terminal determination unit configured to determine the types of the portable terminals; and a terminal signal analysis unit configured to analyze the signals received from the portable terminals according to the types of the portable terminals and generate the normalized data based on results of the analysis.

The terminal determination unit may determine OSs of the portable terminals, and the terminal signal analysis unit may include: a first terminal analyzer configured to analyze a signal received from a first portable terminal supporting a first OS; a second terminal analyzer configured to analyze a signal received from a second portable terminal supporting a second OS; and a normalizer configured to generate the normalized data based on results of the analysis by the first terminal analyzer or the second terminal analyzer.

The first terminal analyzer and the second terminal analyzer may determine groups of the signals received from the portable terminals.

The vehicle may further include a display unit configured to display at least one of navigation information, media information, and telephone information to a user based on the vehicle signal.

In accordance with another aspect of the present invention, a method of controlling a vehicle includes: accessing portable terminals; receiving signals from the portable terminals according to types of the terminals; generating normalized data based on the signals received from the portable terminals; and generating a control signal for controlling a corresponding component in the vehicle based on the normalized data.

BRIEF DESCRIPTION OF THE DRAWINGS

These and/or other aspects of the invention will become apparent and more readily appreciated from the following description of the embodiments, taken in conjunction with the accompanying drawings of which:

FIG. 7 shows examples of results obtained by respective terminal analyzers analyzing signals received from portable terminals based on determination results of a terminal determination unit, according to an embodiment of the present disclosure;

FIG. 8 shows examples of normalized data generated by a normalizer based on determination results of terminal analyzers, according to an embodiment of the present disclosure;

FIG. 9 shows an example of a mapping table of previously stored normalized data and the corresponding vehicle signals, according to an embodiment of the present disclosure;

DETAILED DESCRIPTION

Figure 1:
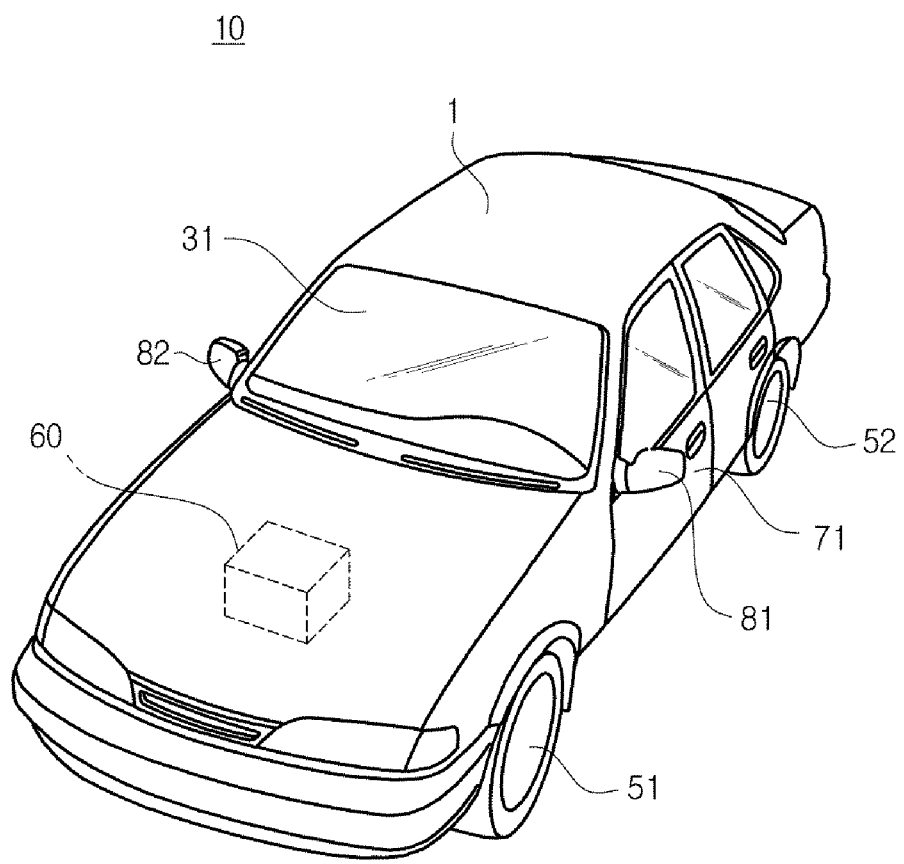
FIG. 1 is a schematic diagram illustrating an appearance of a vehicle having an audio-video navigation (AVN) system, according to an embodiment of the present disclosure.

Reference will now be made in detail to the embodiments of the present invention, examples of which are illustrated in the accompanying drawings, wherein like reference numerals refer to like elements throughout. Further, when it is determined that a detailed description of the related art unnecessarily obscures the gist of the present invention, the detailed description will be omitted. In this specification, the terms "first," "second," etc. are used to distinguish one element from another, and elements are not limited by the terms.

Figure 2:
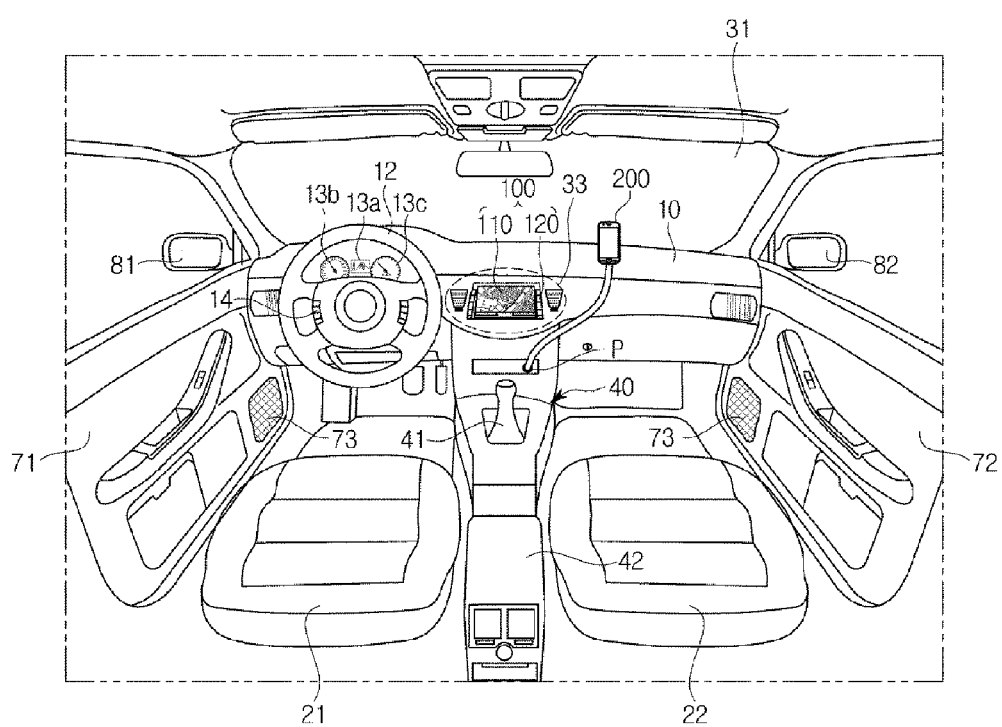
FIGS. 2 and 3 are inner views of vehicles having AVN systems according to embodiments of the present disclosure.
Figure 3:
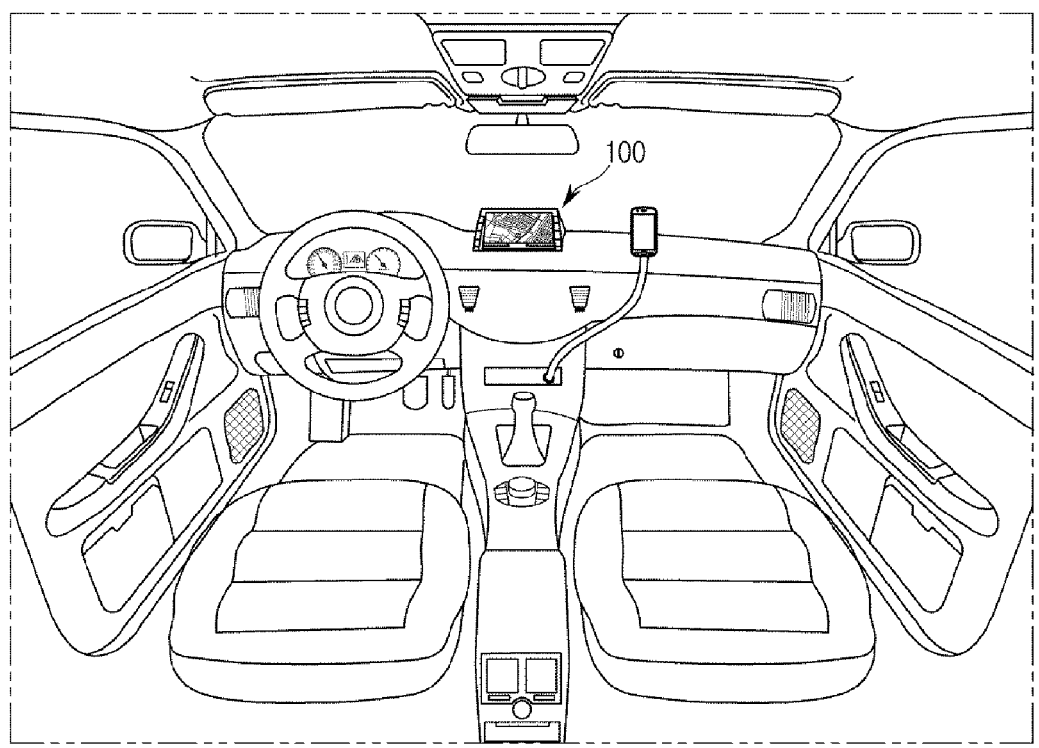
Figure 4:
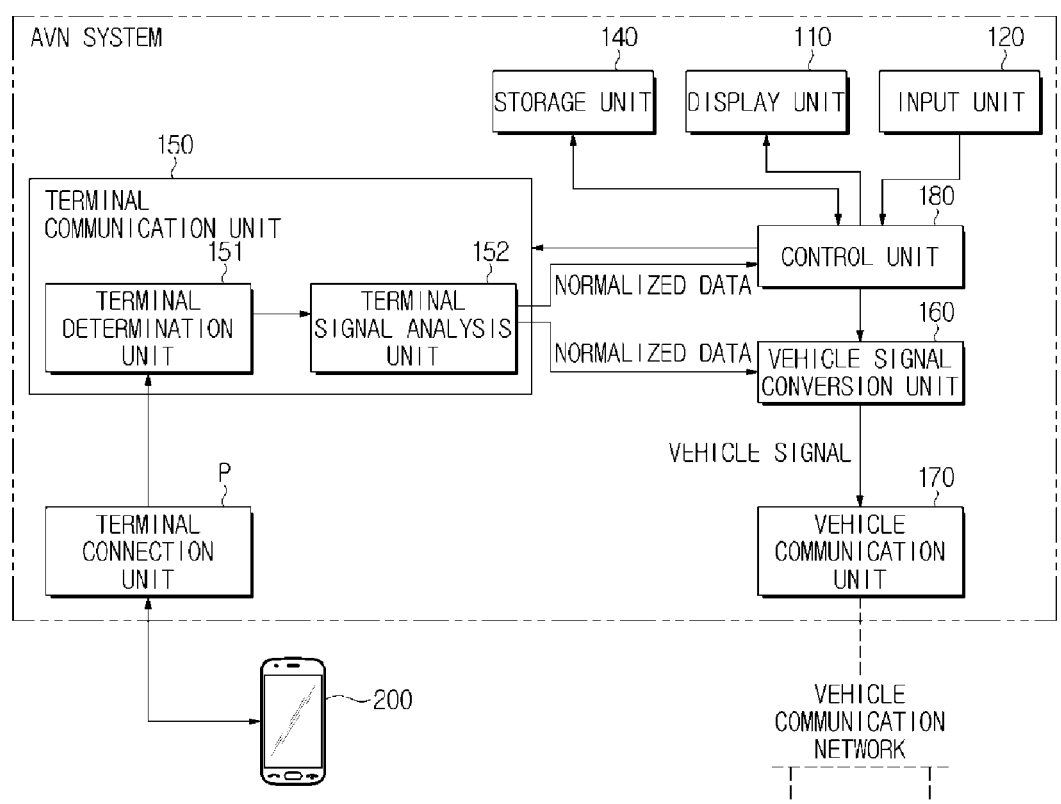
FIG. 4 is a control block diagram of a vehicle according to an embodiment of the present disclosure.

Hereinafter, a vehicle 10 and an audio-video navigation (AVN) system 100 will be described with reference to FIGS. 1 to 4. FIG. 1 is a schematic diagram illustrating an appearance of a vehicle having an AVN system, FIGS. 2 and 3 are inner views of vehicles having AVN systems, and FIG. 4 is a control block diagram of a vehicle.

Referring to FIG. 1, a vehicle 10 according to an embodiment of the present disclosure includes a body 1 forming the appearance of the vehicle 10, wheels 51 and 52 moving the vehicle 10, a drive system 60 rotating the wheels 51 and 52, doors 71 and 72 (see FIG. 2) sheltering the inside of the vehicle 10 from the outside, a windshield 31 allowing a driver in the vehicle 10 to see in front of the vehicle 10, and side mirrors 81 and 82 allowing the driver to see behind the vehicle 10.

The wheels 51 and 52 include a front wheel 51 provided in the front of the vehicle 10 and a rear wheel 52 provided at the back of the vehicle 10, and the drive system 60 provides rotational power to the front wheel 51 or the rear wheel 52 so that the body 1 moves forward or backward. This drive system 60 may employ an engine that generates rotational power by burning fossil fuel or a motor that is supplied with electric power from a condenser (not shown) to generate rotational power.

The doors 71 and 72 are provided to partially rotate on the left and right sides of the body, thus enabling the driver to get in the vehicle 10 in an open state and sheltering the inside of the vehicle 10 from the outside in a closed state.

The windshield 31 is provided in an upper front portion of the body 1 and enables the driver in the vehicle 10 to obtain visual information from in front of the vehicle 10. The windshield 31 is also referred to as windshield glass.

The side mirrors 81 and 82 include a left side mirror 81 provided on the left side of the body 1 and a right side mirror 82 provided on the right side, and enable the driver in the vehicle 10 to obtain visual information from beside and behind the vehicle 10.

In addition to these, the vehicle 10 may include sensors, such as a proximity sensor for sensing an obstacle or another vehicle behind or beside the vehicle 10 and a rain sensor for sensing whether or not it is raining and the amount of precipitation.

Referring to FIG. 2, a steering wheel 12 is provided at a dashboard 10 in front of a driver seat 21. In an area adjacent to an area of the steering wheel 12 at the dashboard 10, a speedometer 13b for showing a current speed of the vehicle 10 and a tachometer 13c for showing the revolutions per minute (RPM) of an engine of the vehicle 10 may be provided, and a cluster display 13a for displaying information on the vehicle 10 may also be provided. In the steering wheel 12, a cluster input unit 14 is provided, so that a user may input a selection of information to be displayed on the cluster display 13a.

In a center console 40, a center input unit (not shown) of a jog shuttle type or a hard key type may be provided. The center console 40 denotes a portion between the driver seat 21 and a front passenger seat 22 in which a gearshift 41 and a tray 42 are formed.

In the doors 71 and 72, sound units 73 for outputting sound may be provided.

The sound units 73 reproduce sound according to control of a control unit 180 (see FIG. 4) in the AVN system 100, which will be described below, and outputs the sound to the user.

The sound units 73 may be implemented as speakers or amplifiers, and may be implemented at various positions in the vehicle 10 other than the doors 71 and 72.

The vehicle 10 according to the embodiment includes the AVN system 100.

As the AVN system 100, audio and multimedia devices, a navigation device, etc. in the vehicle 10 are integrally implemented. The AVN system 100 provides a radio service for playing a radio broadcast based on a ground-wave radio signal, an audio service for playing a compact disk (CD), etc., a video service for playing a digital versatile disk (DVD), etc., a navigation service for performing a destination guidance function, and so on. When the AVN system 100 provides such various services, a display unit 110 may output a screen related to a provided service.

Such an AVN system 100 may be built in the vehicle as shown in FIG. 2, or may be installed to be movable or attachable and detachable in the vehicle 10 as shown in FIG. 3.

Also, the AVN system 100 may include a terminal connection unit P. The terminal connection unit P has a Universal Serial Bus (USB) port, an auxiliary (AUX) port, etc. to be connected to a portable terminal 200 through a cable (illustrated in FIGS. 2 and 3), and has wireless communication modules, such as a Bluetooth module, a wireless fidelity (WiFi) module, a wireless broadband Internet (Wi-Bro) module, an infrared communication module, a radio frequency identification (RFID) communication module, a near field communication (NFC) module, and a Zigbee communication module, to be connected to the portable terminal 200 through a wireless network (not shown in FIG. 2 or 3).

The portable terminal 200 is a device ensuring portability and mobility. The portable terminal 200 includes all types of handheld devices, such as a personal communication system (PCS) terminal, a global system for mobile communications (GSM) terminal, a personal digital cellular (PDC) terminal, a personal handyphone system (PHS) terminal, a personal digital assistant (PDA), an international mobile telecommunication (IMT)-2000 terminal, a code division multiple access (CDMA)-2000 terminal, a wideband code division multiple access (WCDMA) terminal, a WiBro terminal, a portable multimedia player (PMP) terminal, and a smart phone, and also includes a laptop computer, a tablet personal computer (PC), and a slate PC in which a web browser is installed.

The AVN system 100 is connected with the portable terminal 200 through the terminal connection unit P, thereby providing a mirroring service to the user. When the AVN system 100 provides the mirroring service, the display unit 110 may output information received from the portable terminal 200.

The mirroring service is a technique for outputting information to the display unit 110 or controlling the vehicle 10 based on a signal received from the portable terminal 200. Henceforth, the mirroring service may include at least one of Apple CarPlay, Google Android Auto, and Nokia Mirrorlink. However, examples of the mirroring service are not limited to these, and the mirroring service may be a broad concept including modifications within a range that is easily conceivable by those of ordinary skill in the art.

To this end, the AVN system 100 includes the display unit 110 for displaying a screen and an input unit 120 for receiving a manipulation from the user.

The term "manipulation" means an action of pressing or touching a button of the input unit 120 to select a certain icon output on the display unit 110 or execute a desired function.

The display unit 110 may be installed in a center fascia 33 that is the center area of the dashboard 10, and outputs a screen for providing a service (referred to as "AVN screen" below), such as the radio service, the video service, the audio service, or the navigation service, that is autonomously provided to the user by the AVN system 100. Also, when the portable terminal 200 accesses the AVN system 100, the display unit 110 may display a mirroring screen for providing the mirroring service to the user.

Here, the mirroring screens include a screen displayed by the portable terminal 200 as it is, and also a screen showing information generated by the control unit 180 (see FIG. 4) based on a signal received from the portable terminal 200. Since the mirroring screens include a mirroring service home screen of FIG. 11, a navigation screen of FIG. 12, a media screen of FIG. 13, and a telephone screen of FIG. 14 that will be described in detail later, the description thereof will be briefly made below.

Such a mirroring screen may be transferred to the aforementioned cluster display 13a through a vehicle communication network and displayed, or may be displayed on various display devices installed in the vehicle 10 other than the cluster display 13a.

The display unit 110 may be implemented using a plasma display panel (PDP), a light-emitting diode (LED), a liquid crystal display (LCD), or so on.

Also, the display unit 110 may use a three-dimensional (3D) display capable of expressing a 3D image.

The display unit 110 may include a touch screen device. When the display unit 110 includes a touch screen device, the display unit 110 may also perform the function of the input unit 120. The touch screen device may be implemented using a resistive touch screen or a capacitive touch screen. Also, the touch screen device may be implemented using ultrasonic waves or infrared rays.

The input unit 120 enables the user to input various control commands for the AVN system 100 or the portable terminal 200, and has a plurality of screens to enable the user to input a control command while looking at the display unit 110 capable of displaying several screens, such as an AVN screen and a mirroring screen.

The input unit 120 includes a touch screen device as mentioned above. However, the input unit 120 does not necessarily include a touch screen device and may include a hard key, a jog dial, and a remote control separately implemented from the display unit 110.

For example, by pressing the hard key or the touch screen device, the user may select an icon output on the display unit 110 of the AVN system 100 to be provided with an AVN screen or a mirroring screen.

For example, by pressing the hard key or the touch screen device, the user may transmit a control signal to the connected portable terminal 200.

Referring to FIG. 4, the AVN system 100 further includes a storage unit 140 for storing data resulting from use of the AVN system 100, a terminal communication unit 150 for converting a signal received from the portable terminal 200 into normalized data, a vehicle communication unit 170 for connecting the AVN system 100 and other components in the vehicle 10 through the vehicle communication network, a vehicle signal conversion unit 160 for converting a signal transmitted from the terminal communication unit 150 to conform to a protocol required by the vehicle communication unit 170, and the control unit 180 for controlling the overall operation of the respective components of the AVN system 100.

The terminal connection unit P, the display unit 110, and the input unit 120 shown in FIG. 4 have been described above, and the descriptions thereof will not be reiterated.

The storage unit 140 may store various data, programs, or applications for operating and controlling the AVN system 100. The storage unit 140 may store graphic information of icons displayed in the AVN system 100.

Also, the storage unit 140 may store a program, such as a control program for controlling the AVN system 100, a dedicated application provided for the first time by a vendor, or a general-use application downloaded from the internet.

The storage unit 140 may include at least one storage medium among a flash memory, a hard disk, a memory card, a read-only memory (ROM), a random access memory (RAM), an electrically erasable programmable read-only memory (EEPROM), a programmable read-only memory (PROM), a magnetic memory, and an optical disk.

The terminal communication unit 150 accesses the portable terminal 200 through a wired or wireless network to perform communication.

Also, the terminal communication unit 150 includes a terminal determination unit 151 for determining an operating system (OS) and a protocol of the portable terminal 200, and a terminal signal analysis unit 152 for generating normalized data based on the determination results of the terminal determination unit 151 and a signal received from the portable terminal 200.

A detailed configuration and operating method of the terminal communication unit 150 will be described below with reference to FIGS. 5 and 6.

The vehicle signal conversion unit 160 converts the normalized data received from the terminal communication unit 150 into a vehicle signal appropriate for transmission to the vehicle communication network. The vehicle signal is transferred to components of the vehicle 10 (e.g., the cluster display 13a and the sound units 73) other than the AVN system 100 through the vehicle communication unit 170.

The vehicle communication unit 170 transmits and receives signals between the AVN system 100 and other components of the vehicle 10 through the vehicle communication network.

The vehicle communication network may include various wired and wireless communication networks, for example, a controller area network (CAN), a Media Oriented Systems Transport (MOST) communication network, and local interconnect network (LIN), that enable signal transmission and reception between components of the vehicle 10.

For example, the vehicle communication unit 170 may receive current travelling speed information of the vehicle 10 from the speedometer 13b through the CAN. Also, the vehicle communication unit 170 may transfer a vehicle signal generated by the vehicle signal conversion unit 160 to various components, such as the cluster display 13a, in the vehicle 10 through the CAN.

The control unit 180 generates a control signal for controlling each component of the vehicle 10 as well as the AVN system 100. In this case, the control signal to be transferred to a component of the vehicle 10 other than the AVN system 100 is converted into a vehicle signal appropriate for transmission to the vehicle communication network through the vehicle signal conversion unit 160.

Also, based on the normalized data received from the terminal communication unit 150, the control unit 180 may execute a program or an application stored in the storage unit 140 or cause the display unit 110 to display information.

The control unit 180 may include a processor, a ROM storing a control program for control of the AVN system 100, and a RAM that stores a signal or data input from the outside of the AVN system 100 or is used as a storage space corresponding to various tasks performed by the AVN system 100.

In addition, the control unit 180 may include a graphic processing board including a processor, a RAM, or a ROM on a separate circuit board electrically connected to the control unit 180.

The processor, the RAM, and the ROM may be connected to each other through an internal bus.

The control unit 180 may be used as a term referring to a component including the processor, the RAM, and the ROM. Also, the control unit 180 may be used as a term referring to a component including the processor, the RAM, the ROM, and the graphic processing board.

A detailed configuration and operating method of the terminal communication unit 150 will be described below with reference to FIGS. 5 and 6.

Figure 5:
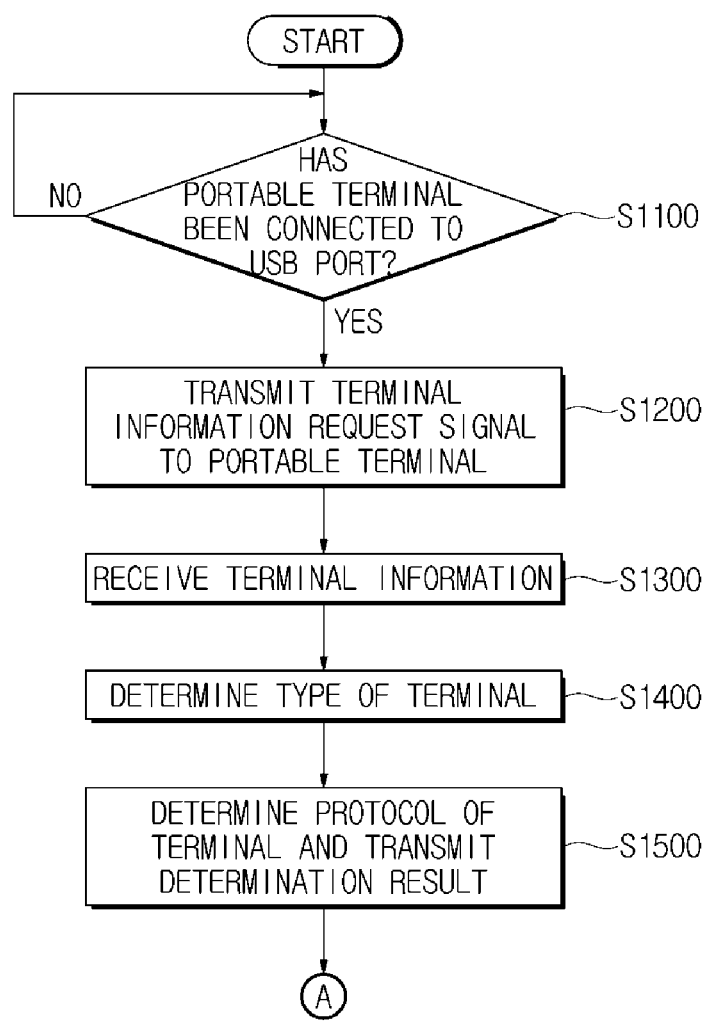
FIG. 5 is a detailed flowchart illustrating control of a terminal determination unit included in a terminal communication unit according to an embodiment of the present disclosure.
Figure 6:
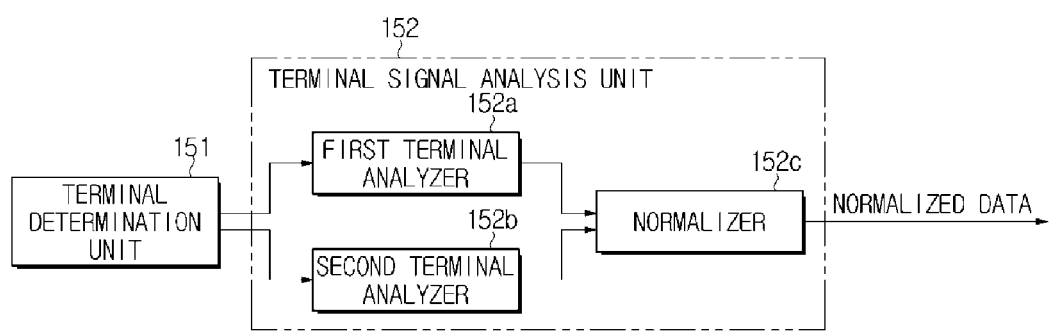
FIG. 6 is a detailed control block diagram of a terminal communication unit according to an embodiment of the present disclosure.

FIG. 5 is a detailed flowchart illustrating control of a terminal determination unit included in a terminal communication unit, and FIG. 6 is a detailed control block diagram of a terminal communication unit.

FIGS. 5 and 6 illustrate a case in which the portable terminal 200 is connected to the USB port in the vehicle 10 as an example, but the type of the terminal connection unit P connected to the portable terminal 200, as discussed above, is not limited to a USB port.

Referring to FIG. 5 first, the terminal determination unit 151 periodically determines whether the portable terminal 200 has been connected to or removed from the USB port (S1100). When the portable terminal 200 has been connected to the USB port, the terminal determination unit 151 transmits a terminal information request signal to the portable terminal 200 (USB enumeration; S1200).

Subsequently, the terminal determination unit 151 receives terminal information from the portable terminal 200 (S1300), and determines the type of the portable terminal 200 based on the terminal information (S1400). In this case, a determination of the type of the portable terminal 200 may be made by, for example, determining the OS of the portable terminal.

The determination of the type of the portable terminal 200 may include searching for a previously stored terminal vendor identification (ID) matching a vendor ID included in the terminal information.

The number of previously stored terminal vendor IDs may be a plurality, and thus the number of OSs that can be determined by the terminal determination unit 151 may also be a plurality.

In addition, the number of the vendor IDs included in the terminal information may be a plurality, and thus the number of the previously stored terminal vendor IDs matching with the vendor IDs included in the terminal information may also be a plurality.

Subsequently, to determine whether the portable terminal 200 is a terminal supporting the mirroring service, the terminal determination unit 151 determines the protocol of the portable terminal 200, and transmits the determination result to the terminal signal analysis unit 152 (S1500).

A determination of the protocol of the portable terminal 200 may include searching for a previously stored terminal product ID matching a product ID included in the terminal information.

The number of previously stored terminal product IDs may be a plurality, and thus the number of determinable protocols may also be a plurality.

In addition, the number of the product IDs included in the terminal information may be a plurality, and thus the number of the previously stored terminal product IDs matching with the product IDs included in the terminal information may also be a plurality.

Transmission of the determination result to the terminal signal analysis unit 152 may include transferring a signal received from the portable terminal 200 to the terminal signal analysis unit 152 when the portable terminal 200 is a terminal supporting the mirroring service.

Also, transmission of the determination result to the terminal signal analysis unit 152 may further include transferring information on the type of the portable terminal 200 corresponding to a matching vendor ID and information on the protocol of the portable terminal 200 corresponding to the product ID to the terminal signal analysis unit 152 when the portable terminal 200 is a terminal supporting the mirroring service.

The above-described operation of determining the type of the portable terminal 200 (S1400) and the operation of determining the protocol of the portable terminal 200 (S1500) may be additionally performed according to the number of previously stored terminal vendor IDs and the number of terminal product IDs. This may be a broad concept including modifications within a range that is easily conceivable by those of ordinary skill in the art.

A case in which a first portable terminal supporting a first OS providing the mirroring service and a first protocol or a second portable terminal providing the mirroring service and supporting a second OS that is different from the first OS, a second protocol, and a third protocol is connected to the terminal connection unit P of the vehicle 10 will be described below as an example.

Referring to FIG. 6, the terminal signal analysis unit 152 includes terminal analyzers 152a and 152b for analyzing a signal received from the portable terminal 200, and a normalizer 152c for generating normalized data based on the results of the analysis by the terminal analyzers 152a and 152b.

In FIG. 6, the first terminal analyzer 152a for analyzing a signal received from the portable terminal 200 supporting the first OS and the second terminal analyzer 152b for analyzing a signal received from the portable terminal 200 supporting the second OS are described as examples of a terminal analyzer, but a third or more terminal analyzers may be additionally provided to support a third or more OSs.

With reference to FIGS. 7 and 8, a signal analysis process of the terminal analyzers 152a and 152b and a normalized data generation process of the normalizer 152c will be described below.

FIG. 7 shows examples of results obtained by respective terminal analyzers analyzing signals received from portable terminals based on determination results of a terminal determination unit, and FIG. 8 shows examples of normalized data generated by a normalizer based on determination results of terminal analyzers.

Referring to FIG. 7, when the first portable terminal is connected to the terminal connection unit P, the first terminal analyzer 152a determines a group of a signal received from the first portable terminal (referred to as "first received signal" below), and transfers group information of the first received signal and the first received signal to the normalizer 152c.

For example, when the first received signal includes information related to the navigation service, such as direction guide information, remaining distance information, or speed camera information, the first terminal analyzer 152a determines the first received signal as a turn-by-turn (TBT) signal, and transfers the first received signal and information indicating that the first received signal is a TBT signal to the normalizer 152c.

Also, for example, when the first received signal includes information related to the radio service, the video service, or the audio service, such as song title information, artist information, or the type of a currently playing medium, the first terminal analyzer 152a determines the first received signal as a media signal, and transfers the first received signal and information indicating that the first received signal is a media signal to the normalizer 152c.

Further, for example, when the first received signal includes telephone state information, such as incoming-call notification information, information of whether or not a call is in progress, caller information, or a phone number, the first terminal analyzer 152a determines the first received signal as a telephone signal, and transfers the first received signal and information indicating that the first received signal is a telephone signal to the normalizer 152c.

When the second portable terminal is connected to the terminal connection unit P, the second terminal analyzer 152b determines a signal received from the second portable terminal (referred to as "second received signal" below) as at least one group, and transfers group information of the second received signal and the second received signal to the normalizer 152c.

The process in which the second terminal analyzer 152b determines the second received signal is the same as the process in which the first terminal analyzer 152a determines the first received signal, and thus the detailed description thereof will be omitted.

Meanwhile, the first terminal analyzer 152a and the second terminal analyzer 152b may determine signals received from the portable terminals as various groups, as well as the aforementioned TBT signal, media signal, and telephone signal.

Alternatively, the terminal analyzers 152a and 152b may make a determination on a signal received from the portable terminals according to protocols of the portable terminals determined by the terminal determination unit 151.

For example, when the second portable terminal supporting the second protocol and the third protocol transmits the second received signal using the second protocol, the second terminal analyzer 152b determines the second received signal as a TBT signal or a media signal. However, when the second portable terminal transmits the second received signal using the third protocol, the second terminal analyzer 152b may determine the second received signal as a telephone signal.

Referring to FIG. 8, based on the results of the analysis by the terminal analyzers 152a and 152b, the normalizer 152c generates normalized data that has one or more field values and has been converted into the form of a character string.

For example, when the first received signal and information indicating that the first received signal is a TBT signal are received from the first terminal analyzer 152a, the normalizer 152c may generate normalized data in which a character string (e.g., "TBT") indicating that the first received signal is a TBT signal is recorded in a first field, a character string (e.g., "Exit Left" in the case of a left exit, "Exit Right" in the case of a right exit, "Turn Left" in the case of a left turn, "Turn Right" in the case of a right turn, "U Turn" in the case of a U-turn, "Keep Straight" in the case of traveling without turning, or "Arrived" in the case of an arrival) representing direction guide information included in the first received signal is recorded in a second field, a character string (e.g., "300 m") representing a remaining distance to a point included in the direction guide information included in the first received signal is recorded in a third field, and a checksum for examining the integrity of data is recorded in a fourth field.

Also, for example, when the first received signal and information indicating that the first received signal is a media signal are received from the first terminal analyzer 152a, the normalizer 152c may generate normalized data in which a character string (e.g., "MEDIA") indicating that the first received signal is a media signal is recorded in a first field, a character string (e.g., "MUSIC" in the case of audio, "INTERNET RADIO" in the case of an Internet radio, or "AOD" in the case of audio on demand) representing media type information included in the first received signal is recorded in a second field, and a checksum for examining the integrity of data is recorded in a third field.

Further, for example, when the first received signal and information indicating that the first received signal is a telephone signal are received from the first terminal analyzer 152a, the normalizer 152c may generate normalized data in which a character string (e.g., "CALL") indicating that the first received signal is a telephone signal is recorded in a first field, a character string (e.g., "Incoming call" in the case of an incoming-call notification, "Active call" in the case of a call in progress, or "Hang up" in a case in which a call has ended) representing telephone state information included in the first received signal is recorded in a second field, and a checksum for examining the integrity of data is recorded in a third field.

When the second received signal and information indicating that the second received signal is a TBT signal, a media signal, or a telephone signal are received from the second terminal analyzer 152b, the normalizer 152c may generate normalized data in the same way as in the case of receiving from the first terminal analyzer 152a, and the description will not be reiterated.

Meanwhile, fields and character strings generated by the normalizer 152c are limited to neither FIG. 8 nor the above-described examples. Rather, fields and character strings may be diversely generated according to settings, thus including modifications within a range that is easily conceivable by those of ordinary skill in the art.

In this way, when the terminal communication unit 150 determines the type of the portable terminal 200, analyzes a received signal according to the type of the portable terminal 200, and generates normalized data according to the results of the analysis regardless of the type of the portable terminal 200, the control unit 180 or the vehicle signal conversion unit 160 is not required to generate a control signal or a vehicle signal differently according to the type of the portable terminal 200 and may generate a control signal or a vehicle signal based on the generated normalized data.

With reference to FIG. 9, a process in which the vehicle signal conversion unit 160 generates a vehicle signal based on normalized data will be described below.

Figure 10:
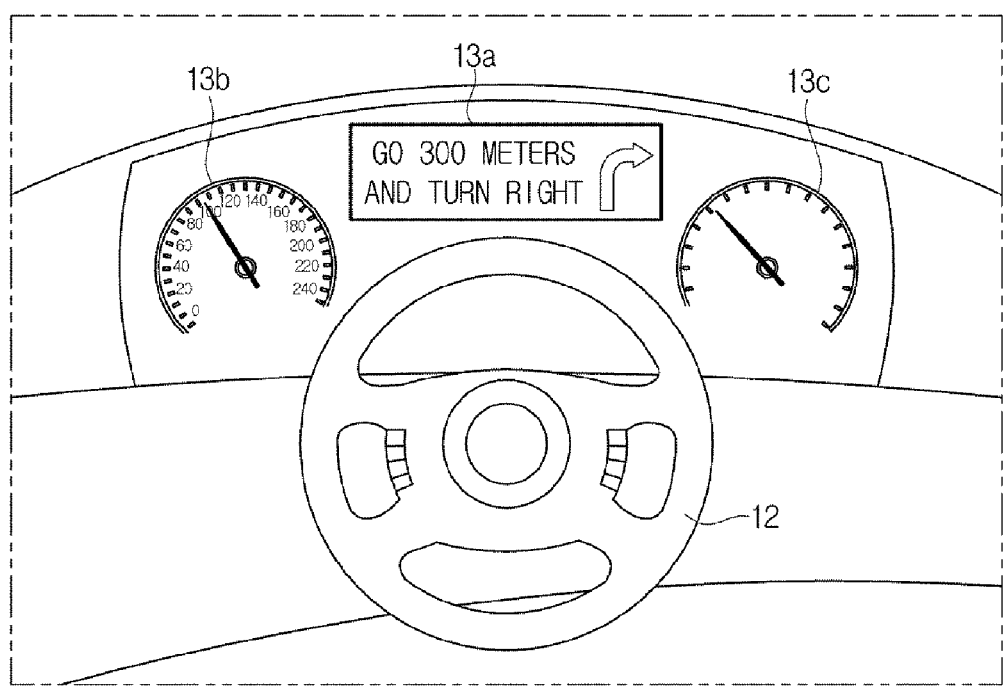
FIG. 10 is an example diagram illustrating a function performed by a component of a vehicle other than an AVN system based on a signal received from a portable terminal.

FIG. 9 shows an example of a mapping table of previously stored normalized data and the corresponding vehicle signals, and FIG. 10 is an example diagram illustrating a function performed by a component of a vehicle other than an AVN system based on a signal received from a portable terminal.

Referring to FIG. 9, the vehicle signal conversion unit 160 determines a signal value matching with received normalized data, and transmits a vehicle signal including the matching signal value to the vehicle communication unit 170. Here, the signal value may be stored in advance according to a protocol required by the vehicle communication unit 170.

For example, when the vehicle communication network is a CAN, the vehicle signal conversion unit 160 may determine a numerical value matching with received normalized data among previously stored numerical values, and transmit a vehicle signal including the matching signal value to the vehicle communication unit 170.

Referring to FIG. 9, when normalized data having "TBT" in a first field, "Exit Left" in a second field, "300 m" in a third field, and a checksum in a fourth field is generated, the vehicle signal conversion unit 160 may transmit a vehicle signal in which a numerical value corresponding to TBT ("1" in FIG. 9) is recorded in a first field, a numerical value corresponding to Exit Left ("01" in FIG. 9) is recorded in a second field, 300 is recorded in a third field, and a numerical value representing a checksum is recorded in a fourth field to the vehicle communication unit 170.

Also, when normalized data having "MEDIA" in a first field, "MUSIC" in a second field, and a checksum in a third field is generated, the vehicle signal conversion unit 160 may transmit a vehicle signal in which a numerical value corresponding to MEDIA ("2" in FIG. 9) is recorded in a first field, a numerical value corresponding to MUSIC ("01" in FIG. 9) is recorded in a second field, and a numerical value representing a checksum is recorded in a third field to the vehicle communication unit 170.

Further, when normalized data having "CALL" in a first field, "Hang up" in a second field, and a checksum in a third field is generated, the vehicle signal conversion unit 160 may transmit a vehicle signal in which a numerical value corresponding to CALL ("3" in FIG. 9) is recorded in a first field, a numerical value corresponding to Hang up ("03" in FIG. 9) is recorded in a second field, and a numerical value representing a checksum is recorded in a third field to the vehicle communication unit 170.

In various ways other than that described above, the vehicle signal conversion unit 160 may also generate a vehicle signal matching with normalized data on a one-to-one basis according to a protocol required by the vehicle communication unit 170, and transmit the vehicle signal to the vehicle communication unit 170.

The vehicle signal transmitted from the vehicle signal conversion unit 160 may be transferred to the vehicle communication network through the vehicle communication unit 170, and may be transferred to various components in the vehicle 10 through the vehicle communication network.

For example, referring to FIG. 10, when the cluster display 13a receives a vehicle signal corresponding to "Turn Right" and "300 m," the cluster display 13a may display a character string "Go 300 meters and turn right."

Meanwhile, normalized data may not only be converted into a vehicle signal by the vehicle signal conversion unit 160 but may also be transferred to the control unit 180 of the AVN system 100 and used to control various applications displayed through the display unit 110.

With reference to FIGS. 11 to 14, an example in which normalized data is used in the AVN system 100 will be described below.

Figure 11:
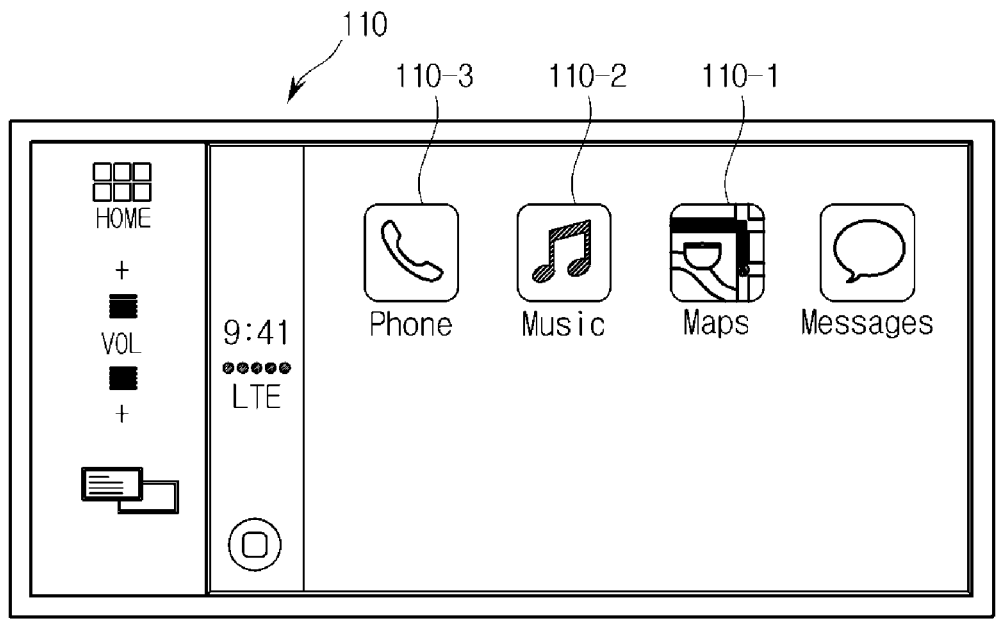
FIG. 11 shows an example of a mirroring service home screen of an AVN system according to an embodiment of the present disclosure.

FIG. 11 shows an example of a mirroring service home screen.

Referring to FIG. 11, the display unit 110 of the AVN system 100 may display a mirroring service home screen, which may be provided in the form of an application list. FIG. 11 is just an example of a displayable application list, and an application list is not limited to the example. When an application icon is selected by a user, a program provided by the mirroring service may be executed.

When a navigation button 110-1 illustrated in FIG. 11 is selected by the user, a navigation screen providing the navigation service may be displayed on the full screen of the display unit 110.

Figure 12:
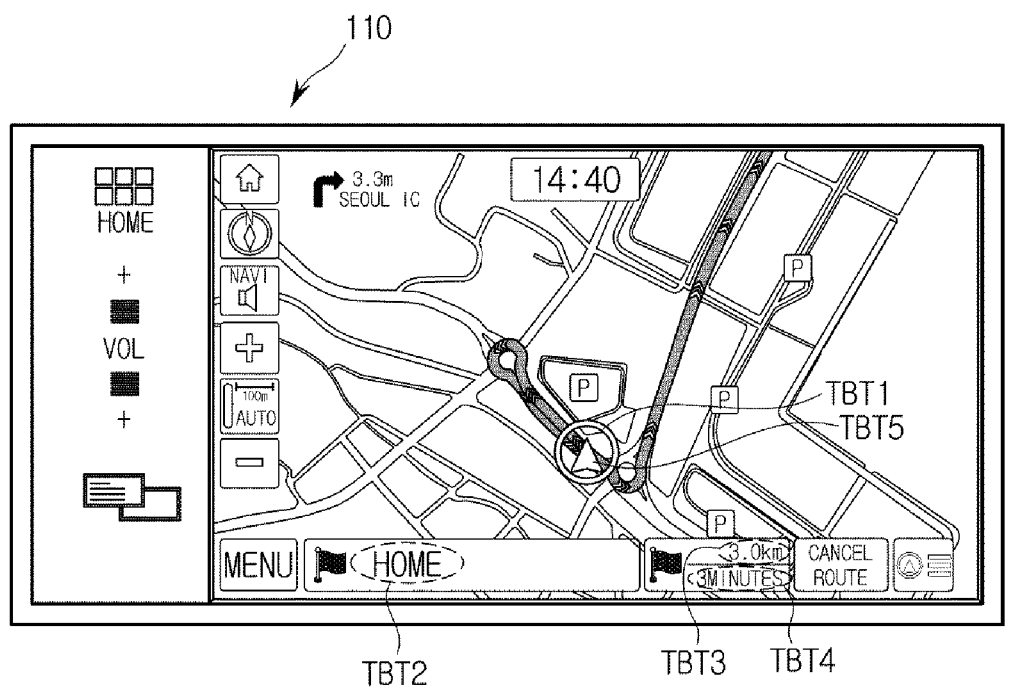
FIG. 12 shows an example of a navigation screen of an AVN system according to an embodiment of the present disclosure.

FIG. 12 shows an example of a navigation screen. Referring to FIG. 12, TBT information, such as a current location TBT1 of the vehicle 10, a destination TBT2, a remaining distance to the destination TBT3, a remaining time to the destination TBT4, and a travelling direction TBT5 of the vehicle 10, may be displayed on a navigation screen.

In this case, the TBT information may be information generated by the control unit 180 based on normalized data.

Meanwhile, when a media play button 110-2 illustrated in FIG. 11 is selected by the user, a media screen may be displayed on the full screen of the display unit 110.

Figure 13:
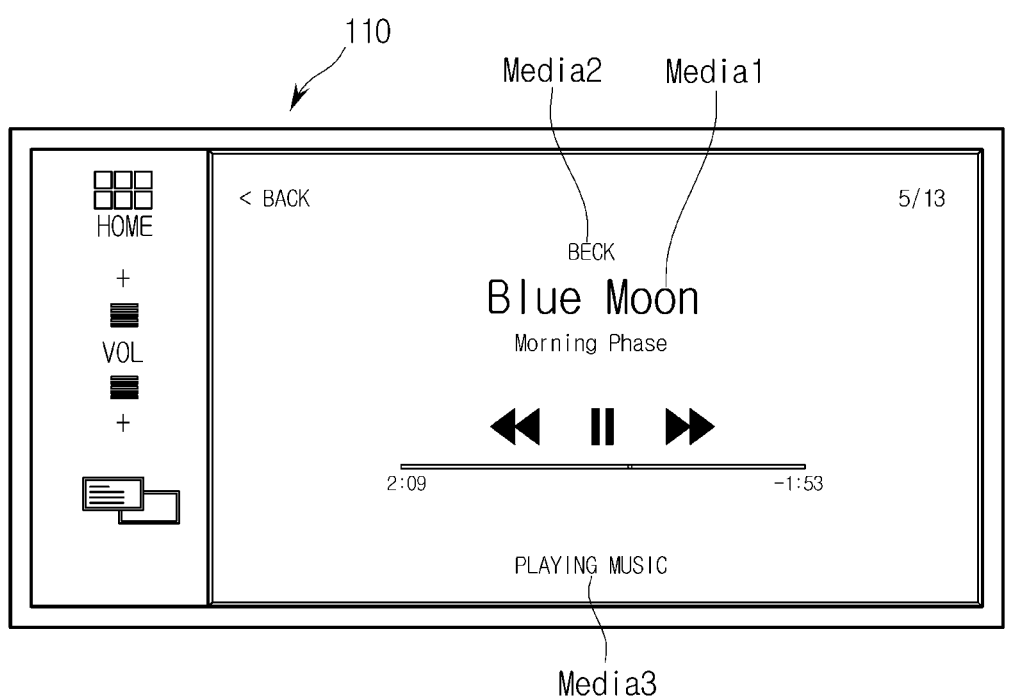
FIG. 13 shows an example of a media screen of an AVN system according to an embodiment of the present disclosure.

FIG. 13 shows an example of a media screen. Referring to FIG. 13, media information, such as song title information Media1, artist information Media2, and the type of a currently playing medium Media3, may be displayed on a media screen.

In this case, the media information may be information generated by the control unit 180 based on normalized data.

Meanwhile, when a telephone button 110-3 illustrated in FIG. 11 is selected by the user, a telephone screen may be displayed on the full screen of the display unit 110.

Figure 14:
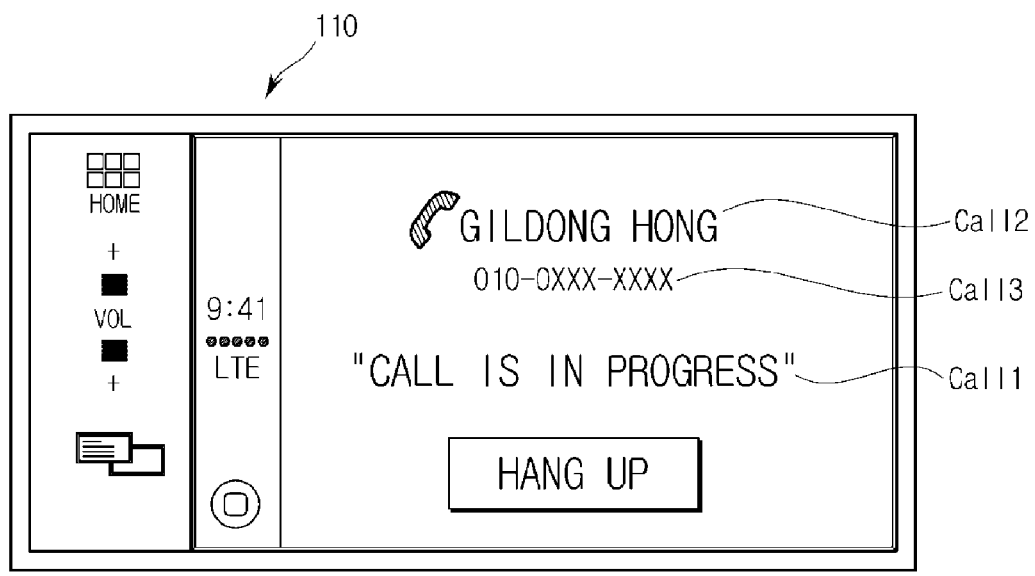
FIG. 14 shows an example of a telephone screen of an system AVN according to an embodiment of the present disclosure.

FIG. 14 shows an example of a telephone screen. Referring to FIG. 14, telephone information, such as incoming-call notification information (not shown), information Call1 of whether or not a call is in progress, caller information Call2, a phone number Call3, etc. may be displayed on a telephone screen.

In this case, the telephone information may be information generated by the control unit 180 based on normalized data.

Figure 15:
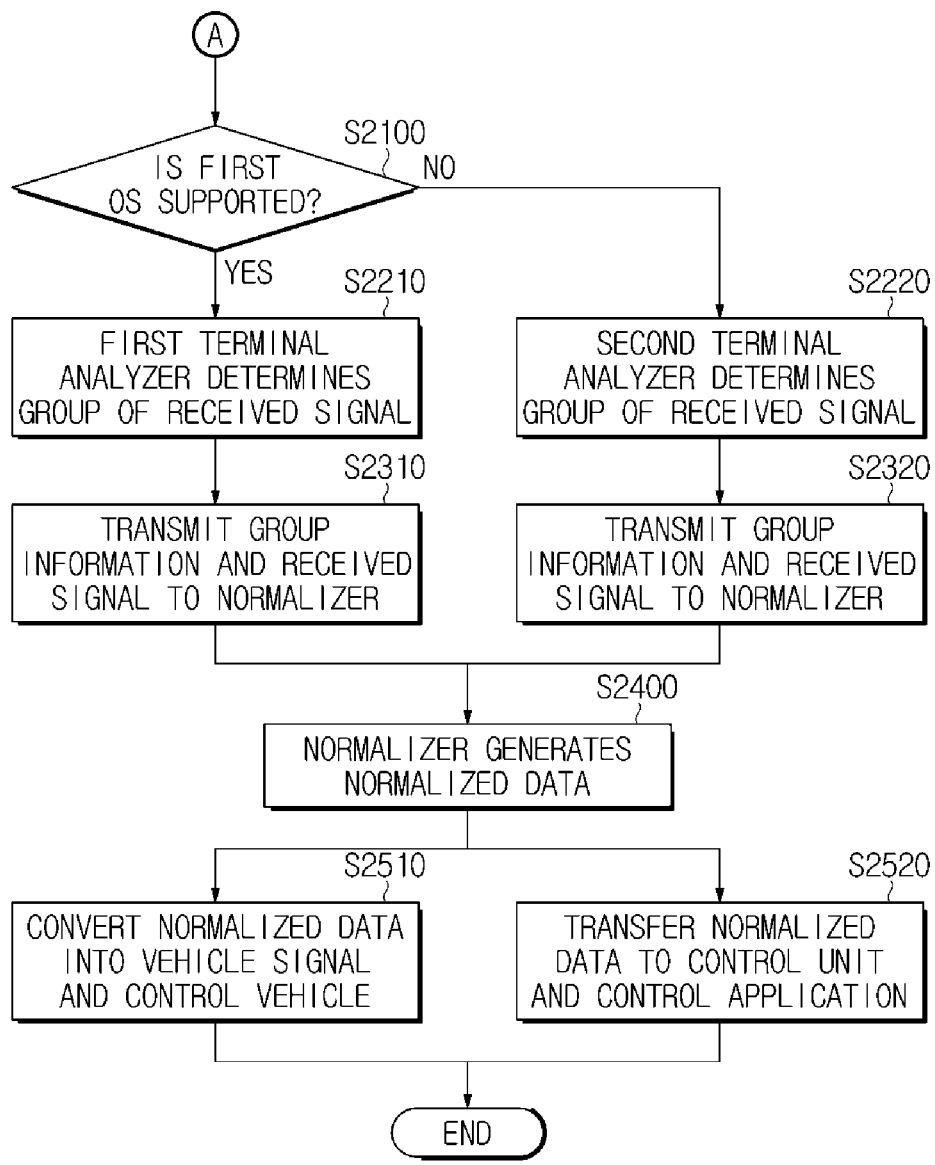
FIG. 15 is a flowchart illustrating a method of controlling a vehicle according to an embodiment of the present disclosure.

With reference to FIGS. 5 and 15, a method of controlling a vehicle will be described below.

FIG. 5 and FIG. 15 are flowcharts illustrating a method of controlling a vehicle according to an embodiment of the present disclosure.

Referring back to FIG. 5, the terminal determination unit 151 periodically determines whether the portable terminal 200 has been connected to or removed from the USB port (S1100). When the portable terminal 200 has been connected to the USB port, the terminal determination unit 151 transmits a terminal information request signal to the portable terminal 200 (USB enumeration; S1200). Subsequently, the terminal determination unit 151 receives terminal information from the portable terminal 200 (S1300), and determines the type of the portable terminal 200 based on the terminal information (S1400). Subsequently, to determine whether the portable terminal 200 is a terminal supporting the mirroring service, the terminal determination unit 151 determines a protocol of the portable terminal 200, and transmits the determination result to the terminal signal analysis unit 152 (S1500).

Subsequently, referring to FIG. 15, when the connected portable terminal 200 supports a first OS ("YES" of S2100), the first terminal analyzer 152a determines a group of a signal received from the portable terminal 200 (S2210). The received signal may be determined as, for example, a TBT signal when including navigation information, a media signal when including media information, or a telephone signal when including information related to a telephone.

Subsequently, the first terminal analyzer 152a transmits group information and the received information to the normalizer 152c (S2310).

On the other hand, when the connected portable terminal 200 supports a second OS ("NO" of S2100), the second terminal analyzer 152b determines a group of a signal received from the portable terminal 200 (S2220). The received signal may be determined as, for example, a TBT signal when including navigation information, a media signal when including media information, or a telephone signal when including information related to a telephone.

Subsequently, the second terminal analyzer 152b transmits group information and the received information to the normalizer 152c (S2320).

Meanwhile, the first terminal analyzer 152a and the second terminal analyzer 152b may determine a group of a received signal based on a protocol supported by the connected portable terminal 200.

FIG. 15 illustrates only the operations S2210 and S2310 of analyzing and transmitting a signal received from the portable terminal 200 supporting the first OS and the operations S2220 and S2320 of analyzing and transmitting a signal received from the portable terminal 200 supporting the second OS as examples, but an operation of analyzing and transmitting a signal according to an OS supported by the terminal signal analysis unit 152, such as an operation of analyzing and transmitting a signal received from the portable terminal 200 supporting a third OS and an operation of analyzing and transmitting a signal received from the portable terminal 200 supporting a fourth OS may be additionally performed.

Subsequently, the normalizer 152c converts the signal received from the portable terminal 200 into normalized data based on the group information (S2400).

The normalized data generated by the normalizer 152c is converted by the vehicle signal conversion unit 160 into a vehicle signal appropriate for a protocol supported by the vehicle communication network and used to control each component of the vehicle 10 (S2510), or is transferred to the control unit 180 and used to control an application or a program of the AVN system 100 (S2520).

A method of controlling the vehicle 10 has been described above with reference to FIGS. 7 to 14, and thus will not be described again.

In the above-described embodiment, the AVN system 100 and some of components constituting the vehicle 10 may be implemented as modules. Here, the term "module" means a software or hardware component, such as a field programmable gate array (FPGA) or an application specific integrated circuit (ASIC), which performs certain roles. However, a module is limited to neither software nor hardware. A module may be configured to reside in an addressable storage medium, or configured to operate one or more processors.

Therefore, by way of example, a module includes components, such as software components, object-oriented software components, class components, and task components, processes, functions, attributes, procedures, subroutines, segments of program code, drivers, firmware, microcodes, circuitry, data, databases, data structures, tables, arrays, and variables. Functions provided by components and modules may be combined into fewer components and modules, or further separated into additional components and modules. Further, the components and the modules may operate one or more central processing units (CPUs) in a device.

Meanwhile, the above-described AVN system 100, the vehicle 10, and the method of controlling the vehicle 10 can be embodied as computer-readable code in a computer-readable recording medium. The computer-readable recording medium includes all types of recording media storing data which can be read by a computer system. Examples of the computer-readable recording medium include a ROM, a RAM, a magnetic tape, a magnetic disk, a flash memory device, an optical data storage device, and so on. The computer-readable recording medium can also be distributed over computer systems connected through a computer communication network so that the computer-readable code is stored and executed in a distributed fashion.

As is apparent from the above description, according to the above-described vehicle and method of controlling the vehicle, one terminal communication unit supporting various types of portable terminals converts a signal received from a portable terminal into uniform normalized data. Therefore, it is not necessary to have respective terminal communication units for converting signals according to types of portable terminals, and connectivity compatibility between a portable terminal and the vehicle is improved.

Also, according to the above-described vehicle and method of controlling the vehicle, it is possible to control a program or an application of an AVN system using generated normalized data.

Further, according to the above-described vehicle and method of controlling the vehicle, it is possible to generate a vehicle signal for communicating with each component of the vehicle using normalized data.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A vehicle comprising:
   a terminal communication unit configured to receive signals from portable terminals according to types of the portable terminals and generate normalized data;
   a controller configured to generate a control signal for controlling a corresponding component in the vehicle based on the normalized data; and
   a display configured to display at least one of navigation information, media information, and telephone information to a user based on the control signal,
   wherein the terminal communication unit comprises:
      a terminal determination unit configured to determine the types of the portable terminals based on vendor identifications included in terminal information of the portable terminals; and
      a terminal signal analysis unit configured to analyze the signals received from the portable terminals according to the types of the portable terminals and generate the normalized data based on results of the analysis, and
   wherein the terminal determination unit is configured to receive the terminal information from the portable terminals, search for previously stored terminal vendor identifications matching the vendor identifications included in the terminal information of the portable terminals, and determine the types of the portable terminals corresponding to the previously stored terminal vendor identifications matching the vendor identifications.

2. The vehicle according to claim 1, further comprising a vehicle signal conversion unit configured to convert the normalized data into a vehicle signal conforming to a protocol supported by a vehicle communication network.

3. The vehicle according to claim 2, wherein the vehicle signal conversion unit converts the normalized data into the vehicle signal conforming to a controller area network (CAN) protocol.

4. The vehicle according to claim 2, wherein the vehicle signal conversion unit converts the normalized data into the vehicle signal including a numerical value.

5. The vehicle according to claim 1, wherein the terminal determination unit determines operating systems (OSs) of the portable terminals, and
   the terminal signal analysis unit comprises:
      a first terminal analyzer configured to analyze a signal received from a first portable terminal supporting a first OS;
      a second terminal analyzer configured to analyze a signal received from a second portable terminal supporting a second OS; and
      a normalizer configured to generate the normalized data based on results of the analysis by the first terminal analyzer or the second terminal analyzer.

6. The vehicle according to claim 5, wherein the first terminal analyzer and the second terminal analyzer determine groups of the signals received from the portable terminals.

7. The vehicle according to claim 6, wherein the first terminal analyzer and the second terminal analyzer determine that the signals received from the portable terminals correspond to at least one of a turn-by-turn (TBT) signal, a media signal, and a telephone signal.

8. The vehicle according to claim 1, wherein the normalized data has a plurality of fields.

9. The vehicle according to claim 1, wherein the normalized data includes a character string.

10. The vehicle according to claim 1, further comprising a Universal Serial Bus (USB) port or an auxiliary (AUX) port connected to the portable terminals through a cable.

11. The vehicle according to claim 1, further comprising a wireless communication module connected to the portable terminals through a wireless communication network.

12. A vehicle comprising:
   a terminal communication unit configured to receive signals from portable terminals according to types of the portable terminals and generate normalized data;
   a vehicle signal conversion unit configured to convert the normalized data into a vehicle signal conforming to a protocol supported by a vehicle communication network; and
   a display configured to display at least one of navigation information, media information, and telephone information to a user based on the vehicle signal,
   wherein the terminal communication unit comprises:
      a terminal determination unit configured to determine the types of the portable terminals based on vendor identifications included in terminal information of the portable terminals; and
      a terminal signal analysis unit configured to analyze the signals received from the portable terminals according to the types of the portable terminals and generate the normalized data based on results of the analysis, and wherein the terminal determination unit is configured to receive the terminal information from the portable terminals, search for previously stored terminal vendor identifications matching the vendor identifications included in the terminal information of the portable terminals, and determine the types of the portable terminals corresponding to the previously stored terminal vendor identifications matching the vendor identifications.

13. The vehicle according to claim 12, wherein the vehicle signal conversion unit converts the normalized data into the vehicle signal conforming to a controller area network (CAN) protocol.

14. The vehicle according to claim 12, wherein the terminal determination unit determines operating systems (OSs) of the portable terminals, and
the terminal signal analysis unit comprises:
- a first terminal analyzer configured to analyze a signal received from a first portable terminal supporting a first OS;
- a second terminal analyzer configured to analyze a signal received from a second portable terminal supporting a second OS; and
- a normalizer configured to generate the normalized data based on results of the analysis by the first terminal analyzer or the second terminal analyzer.

15. The vehicle according to claim 14, wherein the first terminal analyzer and the second terminal analyzer determine groups of the signals received from the portable terminals.

16. A method of controlling a vehicle having a controller, the method comprising:
- receiving, by the controller, signals including terminal information from portable terminals;
- searching, by the controller, for previously stored terminal vendor identifications matching vendor identifications included in the terminal information of the portable terminals;
- determining, by the controller, types of the portable terminals based on the vendor identification;
- analyzing, by the controller, the signals received from the portable terminals according to the types of the portable terminals;
- generating, by the controller, normalized data based on results of the analysis; and
- controlling, by the controller, the vehicle based on the normalized data, which includes controlling a display to display at least one of navigation information, media information, and telephone information to a user,
wherein the determining types of the portable terminals comprises determining types of the portable terminals corresponding to the previously stored terminal vendor identifications matching the vendor identifications.

* * * * *